United States Patent
Park

(10) Patent No.: US 8,157,410 B2
(45) Date of Patent: Apr. 17, 2012

(54) LIGHT UNIT AND DISPLAY APPARATUS HAVING THE LIGHT UNIT

(75) Inventor: Jun Seok Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 1 day.

(21) Appl. No.: 12/438,876

(22) PCT Filed: Dec. 17, 2007

(86) PCT No.: PCT/KR2007/006592
§ 371 (c)(1),
(2), (4) Date: Feb. 25, 2009

(87) PCT Pub. No.: WO2008/078896
PCT Pub. Date: Jul. 3, 2008

(65) Prior Publication Data
US 2009/0237916 A1    Sep. 24, 2009

(30) Foreign Application Priority Data
Dec. 22, 2006   (KR) .................. 10-2006-0132294

(51) Int. Cl.
*F21V 21/00* (2006.01)
(52) U.S. Cl. ... 362/240; 362/97.3; 362/243; 362/249.02
(58) Field of Classification Search .......... 362/612, 362/613, 631, 634, 294, 237, 240, 242, 243, 362/246, 247, 249.02, 255, 256, 97.2, 97.3, 362/97.4
See application file for complete search history.

(56) References Cited

U.S. PATENT DOCUMENTS

| | | | | |
|---|---|---|---|---|
| 4,935,665 A * | 6/1990 | Murata | ......................... | 362/240 |
| 6,320,500 B1 * | 11/2001 | Adelsson et al. | ............ | 362/97.3 |
| 6,857,767 B2 * | 2/2005 | Matsui et al. | ............ | 362/249.02 |
| 7,175,329 B1 * | 2/2007 | Chou | ............................. | 362/612 |
| 7,585,083 B2 * | 9/2009 | Kim et al. | ..................... | 362/97.3 |
| 7,621,654 B2 * | 11/2009 | Nishimoto et al. | ........... | 362/247 |
| 2004/0042194 A1 * | 3/2004 | Hsieh | ............................. | 362/246 |
| 2004/0130515 A1 * | 7/2004 | Chuang et al. | ................... | 345/82 |
| 2004/0223328 A1 * | 11/2004 | Lee et al. | ....................... | 362/240 |
| 2006/0007667 A1 * | 1/2006 | Chen et al. | .................... | 362/246 |
| 2006/0164568 A1 | 7/2006 | Paek et al. | | |
| 2006/0203513 A1 * | 9/2006 | Aoki | ............................. | 362/612 |

(Continued)

FOREIGN PATENT DOCUMENTS

JP   2002-133932 A   5/2002

(Continued)

OTHER PUBLICATIONS

Full English translation of JP 2002-133932.

(Continued)

*Primary Examiner* — Y My Quach Lee
(74) *Attorney, Agent, or Firm* — Birch, Stewart, Kolasch & Birch, LLP

(57) ABSTRACT

A light unit and a display apparatus having the light unit are provided. The light unit comprises a light emitting parts comprising one or more light emitting diodes and an middle optical panel on the light emitting parts comprising a top surface with one or more lens. The display apparatus comprises the light unit, a bottom cover accommodating the light unit, and a display panel on the light unit.

18 Claims, 2 Drawing Sheets

U.S. PATENT DOCUMENTS

| | | | |
|---|---|---|---|
| 2007/0030676 A1* | 2/2007 | Ichihara | 362/240 |
| 2007/0035968 A1* | 2/2007 | Nakano | 362/612 |
| 2007/0035969 A1* | 2/2007 | Kaneko et al. | 362/633 |
| 2007/0103939 A1* | 5/2007 | Huang et al. | 362/633 |
| 2007/0159853 A1* | 7/2007 | Xu | 362/633 |
| 2007/0211205 A1 | 9/2007 | Shibata | |
| 2007/0252163 A1* | 11/2007 | Kuan et al. | 362/249.02 |
| 2008/0043466 A1* | 2/2008 | Chakmakjian et al. | 362/237 |

FOREIGN PATENT DOCUMENTS

| | | |
|---|---|---|
| JP | 2002-298629 A | 10/2002 |
| JP | 2006-58487 A | 3/2006 |
| JP | 2006-251075 A | 9/2006 |
| JP | 2006-337797 A | 12/2006 |
| JP | 2008-172196 A | 7/2008 |
| KR | 10-2005-00112289 A | 11/2005 |
| KR | 10-2006-0086628 A | 8/2006 |
| KR | 10-2006-0118111 A | 11/2006 |

OTHER PUBLICATIONS

Full English translation of JP 2002-298629.
Full English translation of JP 2006-337797.
Full English translation of KR 10-2005-0112289-A.
Full English translation of KR 10-2006-0118111-A.

* cited by examiner

[Fig. 1]
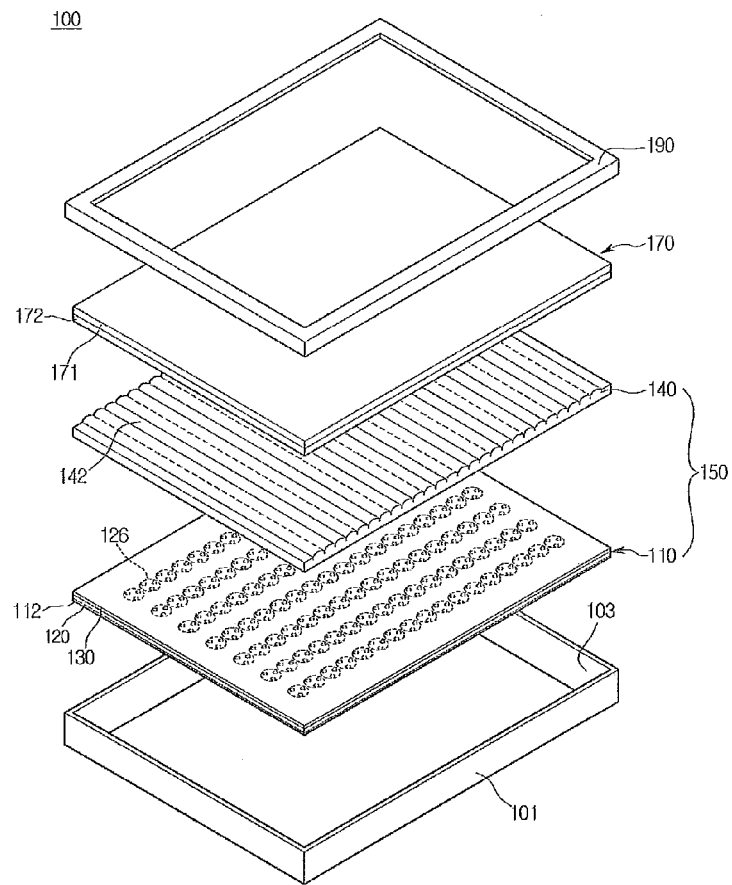
[Fig. 2]
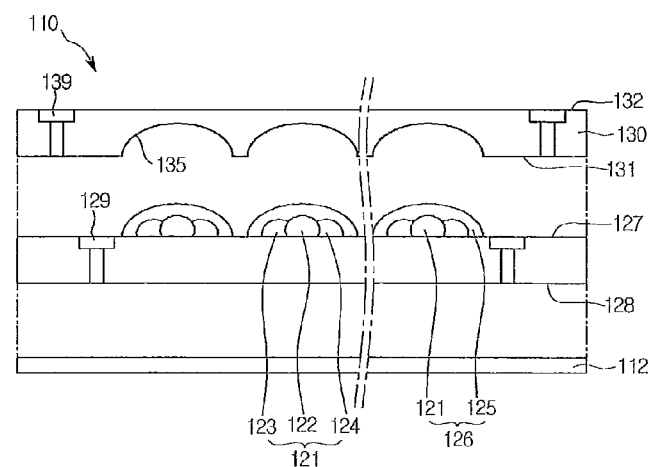
[Fig. 3]
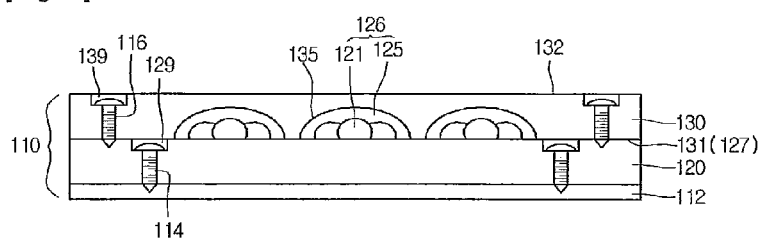

[Fig. 4]
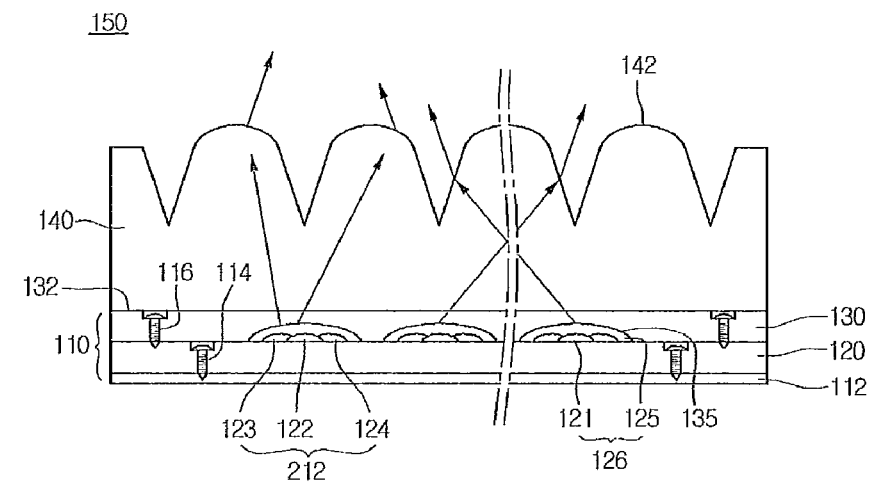
[Fig. 5]
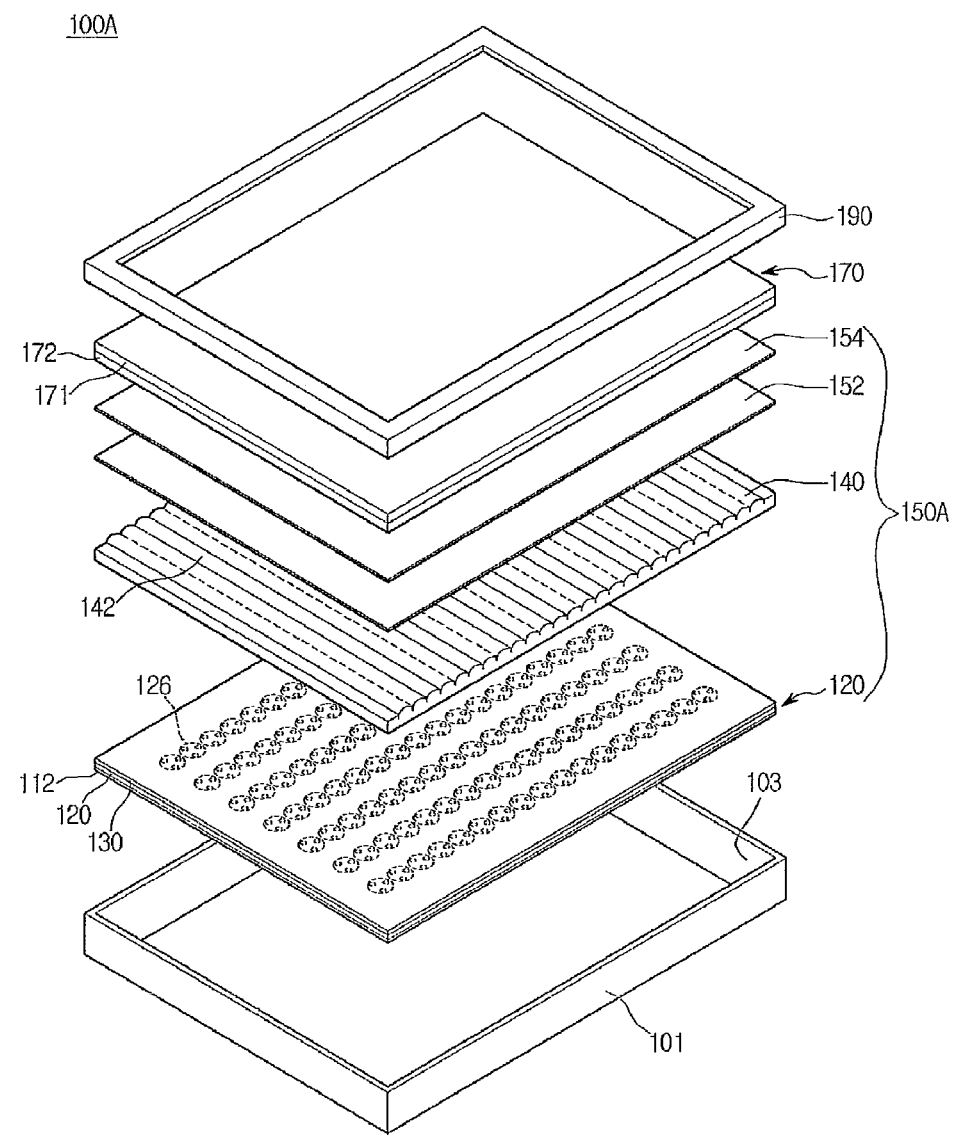

LIGHT UNIT AND DISPLAY APPARATUS HAVING THE LIGHT UNIT

TECHNICAL FIELD

Embodiments relate to a light unit and a display apparatus having the light unit.

BACKGROUND ART

A variety of display apparatus such as a cathode ray tube (CRT), a liquid crystal display (LCD) device using electric field optical effect, a plasma display panel (PDP) using gas discharge, and an electro-luminescence display (ELD) using electric field light emission effect are well known. Among the displays, the LCD device has been actively researched and developed.

The LCD device has been applied to various fields taking advantage of its features of light weight, small thickness, and low power consumption while overcoming disadvantages of the CRT.

The LCD device is a passive-type (non-emissive type) display apparatus that displays an image by adjusting an amount of external light. Therefore, an external light source such as a backlight unit is necessary for the LCD device.

DISCLOSURE OF INVENTION

Technical Problem

Embodiments provide a light unit having a flat panel type light emitting parts and a display having the light unit.

Embodiments provide a light unit that can improve luminance and color uniformity by allowing a flat panel type light emitting parts to closely contact an middle optical panel.

Technical Solution

An embodiment provides a light unit, comprising: a light emitting parts comprising a plurality of light emitting diodes; an middle optical panel on the light emitting parts comprising a top surface with lens array shape.

An embodiment provides a light unit, comprising: a plurality of light emitting diodes on a substrate; and a light transmittable optical panel comprising an under surface with grooves for partly accommodating of the light emitting diodes and a top surface with a lens array shape on the substrate.

An embodiment provides a display apparatus, comprising: a light unit comprising a light emitting parts comprising a plurality of light emitting diodes and an middle optical panel on the light emitting parts comprising a top surface with lens array shape; a bottom cover accommodating the light unit; and a display panel on the light unit.

Advantageous Effects

According to the embodiments, since the light unit is formed in a flat panel type, a thickness of the display apparatus can be reduced.

In addition, since the light unit is formed in a stacked structure having panels, the assembling process can be simplified.

Since a reflecting material is coated in the light unit, an amount of light reflected can be increased.

Since the base optical panel and the middle optical panel are closely contacts on the LEDs of the light unit, the luminance and the color mixture property can be improved.

In addition, since the flat type optical panel is used, there is no need to install guide pins.

The details of one or more embodiments are set forth in the accompanying drawings and the description below. Other features will be apparent from the description and drawings, and from the claims.

BRIEF DESCRIPTION OF THE DRAWINGS

FIG. 1 is a perspective view of a display apparatus according to a first embodiment.

FIG. 2 is an exploded side sectional view of a light emitting parts of FIG. 1.

FIG. 3 is an assembled side sectional view of the light emitting parts of FIG. 2.

FIG. 4 is a side sectional view of a light unit of FIG. 1.

FIG. 5 is a sectional view of a display apparatus according to a second embodiment.

BEST MODE FOR CARRYING OUT THE INVENTION

Hereinafter, a light unit and a display apparatus according to the embodiment will be described with reference to accompanying drawings. It will be understood that when an element is referred to as being 'on' or 'under' another element, it can be directly on/under the element, and one or more intervening elements may also be present.

FIG. 1 is a perspective view of a display apparatus according to a first embodiment.

Referring to FIG. 1, a display apparatus 100 comprises a bottom cover 101, a panel type light unit 150, and a display panel 170.

The bottom cover 101 can accommodate the light unit 150 and form of metal such as aluminum (Al), magnesium (Mg), zinc (Zn), titanium (Ti), tantalum (Ta), hafnium (Hf), niobium (Nb), and the like. A side surface 103 of the bottom cover 101 may be inclined to reflect light. The bottom cover 101 functions as chassis.

The light unit 150 comprises a flat type light emitting parts 110 and an middle optical panel 140. The light emitting parts 110 is formed in a flat panel shape. The light emitting parts 110 generates light, disperses or diffuses the light to form surface-light, and emits the surface-light to a rear surface of the display panel 170.

The light emitting parts 110 comprises a substrate 120 having light emitting diodes (LEDs) 126 and a base optical panel 130. The light emitting parts 110 may further comprise a heat radiating plate 112.

The substrate 120 may be a metal core PCB, an FR-4 PCB, a normal PCB, and the like. This embodiment is not limited to the substrate The LEDs 126 are formed on the substrate 120. The substrate 120 on which the LEDs 126 are formed may be referred to as a LED module.

The LEDs 126 may be formed in a predetermined pattern or randomly formed. The LEDs 126 may be provided in the form of LED bar types each having a plurality of LEDs or directly installed on the substrate 120. The LEDs 126 may be arranged along at least one column or one row. However, this embodiment is not limited to this LEDs configuration.

The LEDs 126 are packaged in a hemispherical or dome shape. The package structure uses at least one LED chip. A color property of the LEDs 126 may vary in accordance with the LED chip. For example, the LEDs 126 may be packaged using a three-color LED chip.

The base optical panel 130 closely contacts on the substrate 120 and has a flat top surface. The base optical panel 120 is formed of a transparent material such as light transmittable resin or polycarbonate. For example, the base optical panel 130 may be formed of a material selected from the group consisting of polymethylmethacrylate (PMMA), polymethylmetaacrylatestyrene, polycarbonate, cycloolefin, and polyethyleneterephthalate.

The base optical panel 130 disperses or diffuses the light generated from the LEDs 126, for example, from the three-color chip to mix the colors.

The heat radiating plate 112 is formed of an aluminum plate and closely contacts an under surface of the substrate 120 to radiate the heat generated from the substrate 120.

The middle optical panel 140 is disposed on the light emitting parts 110. The middle optical panel 140 closely contacts the light emitting parts 110. The middle optical panel 140 disperses or diffuses the light from the light emitting parts 110 and collects the light on the display region.

A lens 142 is formed with the array shape in the top surface of the middle optical panel 140. The lens 142 may be lenticular lens, prism lens, or embossing lens. The lens 142 is spaced apart from each other at regular intervals in a length or width direction. The middle optical panel 140 closely contacts the base optical panel 130. The middle optical panel 140 disperses or diffuses the light incident thereon and adjusts an advancing angle of the light using a property such as a refraction property of the lens 142. Therefore, the middle optical panel 140 enhances the color mixture property of the light and thus improves the color uniformity and luminance.

The middle optical panel 140 has a flat under surface. The middle optical panel 140 is formed of a transparent material such as light transmittable resin or polycarbonate. For example, the middle optical panel 140 may be formed of a material selected from the group consisting of polymethylmethacrylate (PMMA), polymethylmetaacrylatestyrene, polycarbonate, cycloolefin, and polyethyleneterephthalate.

The middle optical panel 140 may be formed of a same or different material as or from the base optical panel 130.

The display panel 170 is disposed on the middle optical panel 140. The display panel 170 displays an image using the light emitted to the rear surface thereof. The display panel 170 comprises first and second transparent substrates 171 and 172 facing each other and a liquid crystal layer (not shown) interposed between the first and second transparent substrates 171 and 172. The first substrate 171 may be, for example, one of a color filter array substrate and a thin film transistor (TFT) array substrate. The second substrate 172 may be, for example, the other of the color filter array substrate and the thin film transistor (TFT) array substrate. Alternatively, the first and second substrates may be formed in a color filter on array (COA) structure where the color filter and the TFT filter are formed on the substrate. In this embodiment, the liquid crystal panel is applied as the display panel by way of example. In this case, a twist nematic (TN) mode, an electrically controlled birefringence (ECB) mode, an optical compensated bend mode (OCB), an in-plane switching (IPS) mode, or a vertical alignment (VA) mode may be applied to the liquid crystal panel. The liquid crystal panel may operate with a normally-white mode or a normally-black mode. However, the present invention is not limited to this embodiment. The display panel may be formed in a variety of structures.

A polarizing panel (not shown) may be attached on top and/or under surfaces of the display panel 170. The polarizing panel transmits light polarized in a direction. When the liquid crystal is a 90°-TN mode, the polarizing panels attached on the top and under surfaces of the display panel 170 have respective polarizing directions perpendicular to each other.

The top cover 190 is disposed on the top surface of the display panel 170 to support a non-display region of the display panel 170. The top cover 190 may be coupled to the bottom cover 101.

As the light unit 150 is formed by providing the base optical panel 130 and the middle optical panel 140 on the substrate 120, there is no need to provide a separate prism sheet, a separate diffusion sheet, and a separate luminance enhanced film. Further, since the light unit 150 can be formed through an assembling process that is simpler than an assembling process for assembling the sheets. Therefore, the manufacturing cost can be reduced. In addition, since no sheet is used, there is no need to install guide pins for preventing the existing sheets from drooping are not required.

FIG. 2 is an exploded side sectional view of the light emitting parts of FIG. 1 and FIG. 3 is an assembled side sectional view of the light emitting parts of FIG. 2.

Referring to FIGS. 2 and 3, the LEDs are disposed on the substrate 120 of the light emitting parts 110. Each of the LEDs 126 may be packaged using a LED chip 121 and a molding member 125. The LED chip 121 may be formed in a single package having a red LED chip 122, a green LED chip 123, and a blue LED chip 124. One of the light emitting chips 122, 123, and 124 may be provided by one or more.

The molding member 125 is formed of a light transmittable material for protecting the LED chip 121. For example, the molding member 125 may be formed of epoxy resin or silicone resin. The molding member 125 is formed in a dome shape or a convex lens shape. The LED 126 may comprises a protecting device such as zenor diode for protecting the LED chip 121. Alternatively, the LED 126 may be provided in the form of a package having a blue LED and a molding member containing phosphors. Alternatively, the LED 126 may be formed using selectively a colored LED chip, an ultraviolet LED chip, and phosphors.

The substrate 120 may be provided in the form of LED bars each having an array of the LEDs 126. The LED bars may be disposed between the base optical panel 120 and the heat radiating plate 112. The light emitted from the three-color LED chips 121 (122, 123, 124) is dispersed or diffused while passing through the base optical panel 130.

The substrate 120 is provided with a plurality of screw-holes 129. The number of the screw-holes 129 varies in accordance with a size of the substrate.

A reflecting material such as Ag may be applied on a region of the top surface 127 of the substrate 120, on which no LED is formed. When a part of the light emitted from the LEDs 126 is incident on the top surface 127 of the substrate 120, the reflecting material reflects the light incident on the top surface 127 of the substrate 120, thereby increasing an amount of the light reflected. A plurality of hemispherical diode grooves 135 are formed on an under surface of the base optical panel 130. The hemispherical diode grooves 135 are formed corresponding to the respective LEDs 126. That is, the hemispherical diode grooves 135 correspond to the convex lens shape of the respective mold members 125. At this point, each hemispherical diode groove 135 corresponds to a side of one LED 126. Alternatively, each hemispherical diode groove 135 may be formed in a valley shape to accommodate a row of the LEDs 126.

The top surface 132 of the base optical panel 130 is flat and provided at an outer side with screw-holes 139.

The heat radiating plate 112 is disposed on an under surface 128 of the substrate 120. The heat radiating plate 112 is formed of aluminum (Al) to radiate heat generated from the substrate 120 when the LEDs 126 emit light.

Referring to FIG. 3, the heat radiating plate 112 is disposed under the substrate 120 and screw-coupled to the substrate 120 by screws 114 passing through the screw-holes 129. Therefore, the substrate 120 and the heat radiating plate 112 are close-coupled to each other. Alternatively, the heat radiating plate 112 may be adhered to the substrate 120 by adhesive or glue.

The base optical panel 130 is coupled to the top surface of the substrate 120. The hemispherical diode grooves 135 of the base optical panel 130 is disposed on the LEDs 126 on the substrate 120, after which the base optical panel 130 is coupled to the substrate 120 by screws 116 passing through the screw-holes 139. Alternatively, the base optical panel 130 may be adhered to the substrate 120 by adhesive or glue.

As the heat radiating plate 112 of the light emitting parts 110, the substrate 120, and the base optical panel 130 are coupled to each other, a flat panel is realized. At this point, the head of the screws 114 and 116 are disposed in the screw holes 129 and 139 and coated with a white material for reflecting the light.

FIG. 4 is a side sectional view of a light unit of FIG. 1.

Referring to FIG. 4, the middle optical panel 140 is coupled to the top surface of the base optical panel 130. That is, a flat under surface of the middle optical panel 140 is closely coupled to the flat top surface 132 of the base optical panel. At this point, the middle optical panel 140 may be coupled to the base optical panel 130 by screws, adhesive, or glue.

The top surface of the middle optical panel 140 is provided with a array shape of convex lens 142. The lens 142 may be arranged in a length or width direction at predetermined intervals.

A diffusion agent may be contained in one of the base optical panel 130 and the middle optical panel 140. The diffusion agent functions to diffuse the incident light. As the diffusion agent, aluminum particles or other particles having a reflection property may be used. The diffusion agent may be fined printed or coated on the top surface of the base optical panel 130.

By the lens 142 of the middle optical panel 140, the light passing through the lens 142 is converged on the display region. That is, the lens 142 refract the incident light at a desired advancing angle. Therefore, the middle optical panel 140 enhances a color mixture of the red, green, and blue lights and collects the light on the display region, thereby improving the luminance and the color uniformity.

As the light unit 150 is designed such that the base optical panel 130 and the middle optical panel 140 are closely stacked on the substrate 120, there is no need to provide a prism sheet, a diffusing sheet, a luminance enhanced sheet, and the like, which were included in the prior art light unit.

In the drawings, although the base optical panel 130 and the middle optical panel 140 are illustrated as separated member, they may be provided in an integrated structure. That is, a plurality of hemispherical diode grooves are formed on an under surface of the integrated optical panel and a array shape of convex lens are formed on a top surface of the integrated optical panel. At this point, a thickness of the integrated optical panel is set considering the color mixture property.

FIG. 5 is a sectional view of a display apparatus according to a second embodiment.

Referring to FIG. 5, the display apparatus 100A comprises a bottom cover 101, a light unit 150A, a display panel 170, and a top cover 190. The light unit 150A may comprise one or more optical sheets disposed above and/or under the middle optical panel.

The optical sheets may be at least one of a diffusing sheet 152, a horizontal and/or vertical prism sheet, and a luminance enhanced film 154. The diffusing sheet 152 diffuses the incident light. The prism sheet compress a horizontal or vertical prism sheet to collect the light passing through the middle optical panel 140 on the display region. The luminance enhanced film 154 is formed using a prism sheet such as a bright enhanced film or/and a double bright enhanced film. The luminance enhanced film 154 transmits light identical to a transmission axis thereof and reflects other lights to recycle the light, thereby enhancing the luminance. At this point, in order to vary the polarization of the light reflected from the luminance enhanced film 154, a polarizer may be further provided.

At least one of the diffusing sheet 152 and the luminance enhanced film 154 may be disposed between the base optical panel 130 and the middle optical panel 140. That is, a sheet is provided above or under the middle optical panel 140 to improve the color mixture property and the luminance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the light unit and the display apparatus having the light unit of the embodiments, since the light unit is formed in a flat panel type, a thickness of the display apparatus can be reduced.

In addition, since the light unit is formed in a stacked structure having panels, the assembling process can be simplified.

Further, since a reflecting material is coated in the light unit, an amount of light reflected can be increased.

Furthermore, since the base optical panel and the intermediate optical panel are closely contacts on the LEDs of the light unit, the luminance and the color mixture property can be improved.

In addition, since the flat type optical panel is used, there is no need to install a guide pins.

The invention claimed is:

1. A light unit comprising:
  a substrate;
  a plurality of clusters of three light emitting diode chips on the substrate;
  a molding member formed of a light transmittable material on each of the clusters of three light emitting diode chips; and
  at least one optical member having a concave portion to accommodate at least one of the clusters of three light emitting diode chips and having a top surface with at least one high point;
  wherein no high point of the optical member is vertically aligned with any of the plurality of clusters of three light emitting diode chips, and wherein the optical member comprises:
a base optical panel having a concave bottom portion to accommodate the three light emitting diode chips and the molding member, and a substantially flat top surface; and
a middle optical panel having a corrugated top surface and a substantially flat bottom surface.

2. The light unit according to claim 1, wherein the molding member is formed of epoxy resin or silicone resin.

3. The light unit according to claim 1, wherein the three light emitting diode chips comprise a red, a green, and a blue light emitting diode chip.

4. The light unit according to claim 1, further comprising a heat radiating plate coupled to the substrate.

5. The light unit according to claim 4, wherein the heat radiating plate is formed of Al.

6. The light unit according to claim 1, wherein the optical member is coupled to the substrate by at least one selected from the group consisting of a screw, an adhesive, and a glue.

7. The light unit according to claim 1, wherein the optical member is formed of light transmittable resin.

8. The light unit according to claim 1, wherein the optical member is formed of at least one selected from the group consisting of polymethylmethacrylate (PMMA), polymethylmetaacrylatestyrene, polycarbonate, cycloolefin, and polyethylene-terephthalate.

9. The light unit according to claim 1, wherein the optical member comprises a diffusing agent.

10. The light unit according to claim 1, wherein the substrate has a hole therein.

11. A light unit comprising:
a substrate;
at least one light emitting diode chip on the substrate;
a molding member formed of a light transmittable material on the at least one light emitting diode chip, the molding member being formed in a dome shape; and
an optical member having a concave portion to accommodate the at least one light emitting diode chip and the molding member,
wherein the optical member has a top surface with at least one high point and at least one depression,
wherein a top surface of the molding member contacts a bottom surface of the optical member,
the at least one light emitting diode chip being vertically aligned with the at least one depression, and
wherein no high point of the optical member is vertically aligned with the at least one light emitting diode chip.

12. The light unit according to claim 11, wherein the at least one light emitting diode chip comprises two light emitting diode chips having different colors.

13. The light unit according to claim 11, wherein the optical member comprises:
a base optical panel having a bottom surface including the concave portion to accommodate the at least one light emitting diode chip and the molding member, and a substantially flat top surface; and
a middle optical panel having a corrugated top surface and a substantially flat bottom surface.

14. A light unit comprising:
a substrate;
a cluster of three light emitting diode chips on the substrate;
a dome-shaped molding member provided on the cluster of three light emitting diode chips; and
an optical member having:
a bottom surface including a concave portion to accommodate the dome-shaped molding member and the cluster of three light emitting diode chips; and
a top surface including a depression vertically aligned with the concave portion of the optical member, and at least one high point,
wherein no high point of the optical member is vertically aligned with the cluster of three light emitting diode chips, and
wherein a top surface of the molding member contacts the bottom surface of the optical member.

15. The light unit according to claim 14, wherein the cluster of three light emitting diode chips comprises red, green, and blue light emitting diode chips.

16. The light unit according to claim 14, wherein a plurality of the clusters of three light emitting diode chips is provided on the substrate.

17. The light unit according to claim 16, wherein the top surface of the optical member includes at least one high point, and wherein no high point of the optical member is vertically aligned with any of the clusters of three light emitting diode chips.

18. The light unit according to claim 14, wherein the optical member comprises:
a base optical panel having the bottom surface including the concave portion, and having a substantially flat top surface; and
a middle optical panel having the top surface including the depression, and having a substantially flat bottom surface.

* * * * *